US012563031B2

(12) United States Patent
Khare et al.

(10) Patent No.: US 12,563,031 B2
(45) Date of Patent: Feb. 24, 2026

(54) APPARATUS, METHODS, AND COMPUTER PROGRAMS

(71) Applicant: Nokia Technologies Oy, Espoo (FI)

(72) Inventors: Saurabh Khare, Bangalore (IN);
Chaitanya Aggarwal, Munich (DE);
Georgios Gkellas, Petroupoli Attica (GR)

(73) Assignee: Nokia Technologies Oy, Espoo (FI)

( * ) Notice: Subject to any disclaimer, the term of this patent is extended or adjusted under 35 U.S.C. 154(b) by 523 days.

(21) Appl. No.: 18/045,910

(22) Filed: Oct. 12, 2022

(65) Prior Publication Data

US 2023/0124206 A1 Apr. 20, 2023

(30) Foreign Application Priority Data

Oct. 18, 2021 (IN) ............................. 202141047172

(51) Int. Cl.
 *H04L 9/40* (2022.01)
(52) U.S. Cl.
 CPC .................................. *H04L 63/083* (2013.01)
(58) Field of Classification Search
 CPC .......................... H04L 63/083; H04L 63/0807
 See application file for complete search history.

(56) References Cited

U.S. PATENT DOCUMENTS

2022/0015023 A1* 1/2022 De-Gregorio-Rodriguez .............. H04W 48/18
2022/0353255 A1* 11/2022 S Bykampadi ....... H04L 63/083
2023/0412589 A1* 12/2023 Jost ...................... H04L 63/083

OTHER PUBLICATIONS

"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V0.6.0, Aug. 2021, pp. 1-48.
"3rd Generation Partnership Project; Technical Specification Group Services and System Aspects; Security architecture and procedures for 5G system (Release 17)", 3GPP TS 33.501, V17.3.0, Sep. 2021, pp. 1-258.
"Authorization mechanisms for data consumer to access data from data producer via DCCF", 3GPP TSG-SA3 Meeting #104-e ad-hoc, S3-213614, Nokia, Sep. 27-30, 2021, 3 pages.

* cited by examiner

*Primary Examiner* — Thaddeus J Plecha
(74) *Attorney, Agent, or Firm* — Duft & Bornsen, PC

(57) ABSTRACT

There is provided an apparatus, method and computer program for a proxy function that causes the apparatus to: receive, from a network repository function, profile information relating to a network function service producer: determine from the profile information whether the network function service producer is able to use an access token for subscribing to a service that indicates a plurality of entities; select a mechanism for requesting an access token for subscribing to a service in dependence on the determination; and request, from the network repository function, a first access token for subscribing to a service on behalf of a first network function service consumer based on the selected mechanism.

20 Claims, 9 Drawing Sheets

APPARATUS, METHODS, AND COMPUTER PROGRAMS

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

There is a need to provide control systems which enable a communications service provider (CSP) to control and optimise a complex network of communications system elements.

One of current approaches being employed is closed-loop automation and machine learning which can be built into self-organizing networks (SON) enabling an operator to automatically optimize every cell in the radio access network.

SUMMARY

According to a first aspect, there is provided an apparatus for a proxy function, the apparatus comprising means for: receiving, from a network repository function, profile information relating to a network function service producer: determining from the profile information whether the network function service producer is able to use an access token for subscribing to a service that indicates a plurality of entities; selecting a mechanism for requesting an access token for subscribing to a service in dependence on the determination; and requesting, from the network repository function, a first access token for subscribing to a service on behalf of a first network function service consumer based on the selected mechanism.

When the network function service producer is determined to be able to use an access token for subscribing to a service that indicates a plurality of entities, the means for requesting may further comprise means for: comprising in a first request an indication that both the proxy function and the first network function service consumer are to be indicated by the first access token; and signalling the first request to the network repository function.

The apparatus may further comprise means for: receiving the first access token from the network repository function; and signalling, to the network function service producer, a first subscription request for said service on behalf of the first network function service consumer, the first subscription request comprising the first access token.

The apparatus may further comprise means for: receiving, from the network function service producer, an indication that a first subscription has been established based on the first subscription request, wherein the indication comprises an identifier of the first subscription.

The apparatus may further comprise means for: receiving, from a second network function service consumer, a request for a subscription to said service; comprising, in a second request, an indication that both the proxy function and the second network function service consumer are to be indicated by a second access token, the second access token being usable for subscribing to a service on behalf of the second network function service consumer based on the selected mechanism; and signalling the second request to the network repository function.

The apparatus may further comprise means for: receiving the second access token from the network repository function; and signalling, to the network function service producer, a second subscription request for said service on behalf of the second network function service consumer, the second subscription request comprising the second access token and an identifier of the first subscription.

The apparatus may further comprise means for: comprising, in the second subscription request, a header and/or flag in a header that explicitly indicates that said subscription request relates to enhancing the first subscription with more recipients of subscription notifications.

When the network function service producer is determined to be unable to use an access token for subscribing to a service that indicates a plurality of entities, the means for requesting may further comprise means for: comprising, in a first request, an indication that the first network function service consumer is to be indicated by the first access token; comprising, in a second request, an indication that the proxy function is to be indicated by a second access token; and signalling the first and second requests to the network repository function.

The apparatus may further comprise means for: receiving respective first and second access tokens in response to the signalled requests; determining whether to allow a subscription to be established in dependence on the first access token; and when it is determined to allow the subscription to be established, signalling a first subscription request for a service to the network function service producer, the first subscription request comprising the second access token.

The apparatus may further comprise means for: receiving, from a second network function service consumer, a request for a subscription to said service; comprising, in a third request, an indication that the second network function service consumer is to be indicated by a third access token, the third access token being usable for subscribing to a service on behalf of the second network function service consumer based on the selected mechanism; and signalling the third request to the network repository function.

The apparatus may further comprise means for: receiving the third access token in response to the signalled request; determining whether to allow a subscription to be established in dependence on the third access token; and when it is determined to allow the subscription to be established, forwarding received subscription information to both the first and second network function consumers.

The apparatus may further comprise means for: registering profile information for the proxy function at the network repository information, wherein the profile information indicates whether the proxy function is able to allow subscription requests to proceed for a plurality of consumer network functions.

According to a second aspect, there is provided an apparatus for a network repository function, the apparatus comprising means for: receiving, from a network function service producer, an indication of whether the network function service producer is able to use an access token for subscription to a service that indicates a plurality of entities; storing profile information for the network function service producer, the profile information comprising said indication; receiving, from a proxy function, a request for the profile information; and providing the profile information to the proxy function.

The received indication may be an implicit indication.

The received indication may be an explicit indication.

The apparatus may further comprise means for: receiving, from the proxy function, a request for a first access token for subscribing to a service provided by the network function service producer, the request for the first access token comprising an indication of the proxy function and an indication of a first network function service consumer; generating the first access token, the first access token comprising an indication of the proxy function and an indication of the first network function service consumer; and providing the first access token to the proxy function.

The apparatus may further comprise means for: receiving, from the proxy function, a request for a second access token for subscribing to a service provided by the network function service producer, the request for the second access token comprising an indication of the proxy function and an indication of a second network function service consumer; generating the second access token, the second access token comprising an indication of the proxy function and an indication of the second network function service consumer; and providing the second access token to the proxy function.

The apparatus may further comprise means for: receiving, from the proxy function, a request for a first access token for subscribing to a service provided by the network function service producer, the request for the first access token comprising an indication of an indication of a first network function service consumer; generating the first access token, the first access token comprising an indication of the first network function service consumer; receiving, from the proxy function, a request for a second access token for subscribing to a service provided by the network function service producer, the request for the second access token comprising an indication of the proxy function; generating the second access token, the second access token comprising an indication of the proxy function; and providing the first and second access tokens to the proxy function.

The apparatus may further comprise means for: receiving, from the proxy function, a request for a third access token for subscribing to a service provided by the network function service producer, the request for the third access token comprising an indication of a second network function service consumer; generating the third access token, the third access token comprising an indication of the second network function service consumer; and providing the third access token to the proxy function.

The apparatus may further comprise means for: registering profile information for the proxy function, wherein the profile information indicates whether the proxy function is able to allow subscription requests to proceed for a plurality of consumer network functions.

According to a third aspect, there is provided an apparatus for a network function, the apparatus comprising means for: signalling, to a network repository function, a request to register profile information for the network function at the network repository function, wherein the request to register comprises an indication of whether the network function is able to, when operating as a network function service producer, use an access token for subscription to a service that indicates a plurality of entities.

The apparatus may further comprise means for: receiving, from a proxy function, a first subscription request for providing a service on behalf of a first network function service consumer, the first subscription request comprising a first access token that indicates both the first network function service consumer and the proxy function; establishing a first subscription in response to authorizing the subscription request using the first access token, the first subscription being associated with a first subscription identifier; and providing the proxy function with the first subscription identifier.

The apparatus may further comprise means for: receiving, from the proxy function, a second subscription request for providing the service on behalf of a second network function service consumer, the second subscription request comprising a second access token that indicates both the second network function service consumer and the proxy function, the first subscription identifier, and a header and/or flag in a header that explicitly indicates that said subscription request relates to enhancing the first subscription with more recipients of subscription notifications.

According to a fourth aspect, there is provided an apparatus for a proxy function, the apparatus comprising: at least one processor; and at least one memory comprising code that, when executed by the at least one processor, causes the apparatus to: receive, from a network repository function, profile information relating to a network function service producer: determine from the profile information whether the network function service producer is able to use an access token for subscribing to a service that indicates a plurality of entities; select a mechanism for requesting an access token for subscribing to a service in dependence on the determination; and request, from the network repository function, a first access token for subscribing to a service on behalf of a first network function service consumer based on the selected mechanism.

When the network function service producer is determined to be able to use an access token for subscribing to a service that indicates a plurality of entities, the requesting may further comprise: comprising in a first request an indication that both the proxy function and the first network function service consumer are to be indicated by the first access token; and signalling the first request to the network repository function.

The apparatus may further be caused to: receive the first access token from the network repository function; and signal, to the network function service producer, a first subscription request for said service on behalf of the first network function service consumer, the first subscription request comprising the first access token.

The apparatus may further be caused to: receive, from the network function service producer, an indication that a first subscription has been established based on the first subscription request, wherein the indication comprises an identifier of the first subscription.

The apparatus may further be caused to: receive, from a second network function service consumer, a request for a subscription to said service; comprising, in a second request, an indication that both the proxy function and the second network function service consumer are to be indicated by a second access token, the second access token being usable for subscribing to a service on behalf of the second network function service consumer based on the selected mechanism; and signal the second request to the network repository function.

The apparatus may further be caused to: receive the second access token from the network repository function; and signal, to the network function service producer, a second subscription request for said service on behalf of the second network function service consumer, the second subscription request comprising the second access token and an identifier of the first subscription.

The apparatus may further be caused to: comprise, in the second subscription request, a header and/or flag in a header that explicitly indicates that said subscription request relates to enhancing the first subscription with more recipients of subscription notifications.

When the network function service producer is determined to be unable to use an access token for subscribing to a service that indicates a plurality of entities, the requesting may further comprise: comprising, in a first request, an indication that the first network function service consumer is to be indicated by the first access token; comprising, in a second request, an indication that the proxy function is to be indicated by a second access token; and signalling the first and second requests to the network repository function.

The apparatus may further be caused to: receive respective first and second access tokens in response to the signalled requests; determine whether to allow a subscription to be established in dependence on the first access token; and when it is determined to allow the subscription to be established, signal a first subscription request for a service to the network function service producer, the first subscription request comprising the second access token.

The apparatus may further be caused to: receive, from a second network function service consumer, a request for a subscription to said service; comprising, in a third request, an indication that the second network function service consumer is to be indicated by a third access token, the third access token being usable for subscribing to a service on behalf of the second network function service consumer based on the selected mechanism; and signal the third request to the network repository function.

The apparatus may further be caused to: receive the third access token in response to the signalled request; determine whether to allow a subscription to be established in dependence on the third access token; and when it is determined to allow the subscription to be established, forward received subscription information to both the first and second network function consumers.

The apparatus may further be caused to: register profile information for the proxy function at the network repository information, wherein the profile information indicates whether the proxy function is able to allow subscription requests to proceed for a plurality of consumer network functions.

According to a fifth aspect, there is provided an apparatus for a network repository function, the apparatus comprising: at least one processor; and at least one memory comprising code that, when executed by the at least one processor, causes the apparatus to: receive, from a network function service producer, an indication of whether the network function service producer is able to use an access token for subscription to a service that indicates a plurality of entities; store profile information for the network function service producer, the profile information comprising said indication; receive, from a proxy function, a request for the profile information; and provide the profile information to the proxy function.

The received indication may be an implicit indication.

The received indication may be an explicit indication.

The apparatus may further be caused to: receive, from the proxy function, a request for a first access token for subscribing to a service provided by network function service producer, the request for the first access token comprising an indication of the proxy function and an indication of a first network function service consumer; generate the first access token, the first access token comprising an indication of the proxy function and an indication of the first network function service consumer; and provide the first access token to the proxy function.

The apparatus may further be caused to: receive, from the proxy function, a request for a second access token for subscribing to a service provided by the network function service producer, the request for the second access token comprising an indication of the proxy function and an indication of a second network function service consumer; generate the second access token, the second access token comprising an indication of the proxy function and an indication of the second network function service consumer; and provide the second access token to the proxy function.

The apparatus may further be caused to: receive, from the proxy function, a request for a first access token for subscribing to a service provided by the network function service producer, the request for the first access token comprising an indication of an indication of a first network function service consumer; generate the first access token, the first access token comprising an indication of the first network function service consumer; receive, from the proxy function, a request for a second access token for subscribing to a service provided by the network function service producer, the request for the second access token comprising an indication of the proxy function; generate the second access token, the second access token comprising an indication of the proxy function; and provide the first and second access tokens to the proxy function.

The apparatus may further be caused to: receive, from the proxy function, a request for a third access token for subscribing to a service provided by the network function service producer, the request for the third access token comprising an indication of a second network function service consumer; generate the third access token, the third access token comprising an indication of the second network function service consumer; and provide the third access token to the proxy function.

The apparatus may further be caused to: register profile information for the proxy function, wherein the profile information indicates whether the proxy function is able to allow subscription requests to proceed for a plurality of consumer network functions.

According to a sixth aspect, there is provided an apparatus for a network function, the apparatus comprising: at least one processor; and at least one memory comprising code that, when executed by the at least one processor, causes the apparatus to: signal, to a network repository function, a request to register profile information for the network function at the network repository function, wherein the request to register comprises an indication of whether the network function is able to, when operating as a network function service producer, use an access token for subscription to a service that indicates a plurality of entities.

The apparatus may further be caused to: receive, from a proxy function, a first subscription request for providing a service on behalf of a first network function service consumer, the first subscription request comprising a first access token that indicates both the first network function service consumer and the proxy function; establish a first subscription in response to authorizing the subscription request using the first access token, the first subscription being associated with a first subscription identifier; and provide the proxy function with the first subscription identifier.

The apparatus may further be caused to: receive, from the proxy function, a second subscription request for providing the service on behalf of a second network function service consumer, the second subscription request comprising a second access token that indicates both the second network function service consumer and the proxy function, the first subscription identifier, and a header and/or flag in a header that explicitly indicates that said subscription request relates to enhancing the first subscription with more recipients of subscription notifications.

According to a seventh aspect, there is provided a method for an apparatus for a proxy function, the method comprising: receiving, from a network repository function, profile information relating to a network function service producer: determining from the profile information whether the network function service producer is able to use an access token for subscribing to a service that indicates a plurality of entities; selecting a mechanism for requesting an access token for subscribing to a service in dependence on the determination; and requesting, from the network repository function, a first access token for subscribing to a service on behalf of a first network function service consumer based on the selected mechanism.

When the network function service producer is determined to be able to use an access token for subscribing to a service that indicates a plurality of entities, the requesting may further comprise: comprising in a first request an indication that both the proxy function and the first network function service consumer are to be indicated by the first access token; and signalling the first request to the network repository function.

The method may further comprise: receiving the first access token from the network repository function; and signalling, to the network function service producer, a first subscription request for said service on behalf of the first network function service consumer, the first subscription request comprising the first access token.

The method may further comprise: receiving, from the network function service producer, an indication that a first subscription has been established based on the first subscription request, wherein the indication comprises an identifier of the first subscription.

The method may further comprise: receiving, from a second network function service consumer, a request for a subscription to said service; comprising, in a second request, an indication that both the proxy function and the second network function service consumer are to be indicated by a second access token, the second access token being usable for subscribing to a service on behalf of the second network function service consumer based on the selected mechanism; and signalling the second request to the network repository function.

The method may further comprise: receiving the second access token from the network repository function; and signalling, to the network function service producer, a second subscription request for said service on behalf of the second network function service consumer, the second subscription request comprising the second access token and an identifier of the first subscription.

The method may further comprise: comprising, in the second subscription request, a header and/or flag in a header that explicitly indicates that said subscription request relates to enhancing the first subscription with more recipients of subscription notifications.

When the network function service producer is determined to be unable to use an access token for subscribing to a service that indicates a plurality of entities, the requesting may further comprise: comprising, in a first request, an indication that the first network function service consumer is to be indicated by the first access token; comprising, in a second request, an indication that the proxy function is to be indicated by a second access token; and signalling the first and second requests to the network repository function.

The method may further comprise: receiving respective first and second access tokens in response to the signalled requests; determining whether to allow a subscription to be established in dependence on the first access token; and when it is determined to allow the subscription to be established, signalling a first subscription request for a service to the network function service producer, the first subscription request comprising the second access token.

The method may further comprise: receiving, from a second network function service consumer, a request for a subscription to said service; comprising, in a third request, an indication that the second network function service consumer is to be indicated by a third access token, the third access token being usable for subscribing to a service on behalf of the second network function service consumer based on the selected mechanism; and signalling the third request to the network repository function.

The method may further comprise: receiving the third access token in response to the signalled request; determining whether to allow a subscription to be established in dependence on the third access token; and when it is determined to allow the subscription to be established, forwarding received subscription information to both the first and second network function consumers.

The method may further comprise: registering profile information for the proxy function at the network repository information, wherein the profile information indicates whether the proxy function is able to allow subscription requests to proceed for a plurality of consumer network functions.

According to an eighth second aspect, there is provided a method for an apparatus for a network repository function, the method comprising: receiving, from a network function service producer, an indication of whether the network function service producer is able to use an access token for subscription to a service that indicates a plurality of entities; storing profile information for the network function service producer, the profile information comprising said indication;

receiving, from a proxy function, a request for the profile information; and providing the profile information to the proxy function.

The received indication may be an implicit indication.

The received indication may be an explicit indication.

The method may further comprise: receiving, from the proxy function, a request for a first access token for subscribing to a service provided by the network function service producer, the request for the first access token comprising an indication of the proxy function and an indication of a first network function service consumer; generating the first access token, the first access token comprising an indication of the proxy function and an indication of the first network function service consumer; and providing the first access token to the proxy function.

The method may further comprise: receiving, from the proxy function, a request for a second access token for subscribing to a service provided by the network function service producer, the request for the second access token comprising an indication of the proxy function and an indication of a second network function service consumer; generating the second access token, the second access token comprising an indication of the proxy function and an indication of the second network function service consumer; and providing the second access token to the proxy function.

The method may further comprise for: receiving, from the proxy function, a request for a first access token for subscribing to a service provided by the network function service producer, the request for the first access token comprising an indication of an indication of a first network function service consumer; generating the first access token, the first access token comprising an indication of the first network function service consumer; receiving, from the proxy function, a request for a second access token for subscribing to a service provided by the network function service producer, the request for the second access token comprising an indication of the proxy function; generating the second access token, the second access token comprising an indication of the proxy function; and providing the first and second access tokens to the proxy function.

The method may further comprise: receiving, from the proxy function, a request for a third access token for subscribing to a service provided by the network function service producer, the request for the third access token comprising an indication of a second network function service consumer; generating the third access token, the third access token comprising an indication of the second network function service consumer; and providing the third access token to the proxy function.

The method may further comprise: registering profile information for the proxy function, wherein the profile information indicates whether the proxy function is able to allow subscription requests to proceed for a plurality of consumer network functions.

According to a ninth aspect, there is provided a method for an apparatus for a network function, the method comprising: signalling, to a network repository function, a request to register profile information for the network function at the network repository function, wherein the request to register comprises an indication of whether the network function is able to, when operating as a network function service producer, use an access token for subscription to a service that indicates a plurality of entities.

The method may further comprise: receiving, from a proxy function, a first subscription request for providing a service on behalf of a first network function service consumer, the first subscription request comprising a first access token that indicates both the first network function service consumer and the proxy function; establishing a first subscription in response to authorizing the subscription request using the first access token, the first subscription being associated with a first subscription identifier; and providing the proxy function with the first subscription identifier.

The method may further comprise: receiving, from the proxy function, a second subscription request for providing the service on behalf of a second network function service consumer, the second subscription request comprising a second access token that indicates both the second network function service consumer and the proxy function, the first subscription identifier, and a header and/or flag in a header that explicitly indicates that said subscription request relates to enhancing the first subscription with more recipients of subscription notifications.

According to a tenth aspect, there is provided an apparatus for a proxy function, the apparatus comprising: receiving circuitry for receiving, from a network repository function, profile information relating to a network function service producer: determining circuitry for determining from the profile information whether the network function service producer is able to use an access token for subscribing to a service that indicates a plurality of entities; selecting circuitry for selecting a mechanism for requesting an access token for subscribing to a service in dependence on the determination; and requesting circuitry for requesting, from the network repository function, a first access token for subscribing to a service on behalf of a first network function service consumer based on the selected mechanism.

When the network function service producer is determined to be able to use an access token for subscribing to a service that indicates a plurality of entities, the requesting circuitry for requesting may further comprise: comprising circuitry for comprising in a first request an indication that both the proxy function and the first network function service consumer are to be indicated by the first access token; and signalling circuitry for signalling the first request to the network repository function.

The apparatus may further comprise: receiving circuitry for receiving the first access token from the network repository function; and signalling circuitry for signalling, to the network function service producer, a first subscription request for said service on behalf of the first network function service consumer, the first subscription request comprising the first access token.

The apparatus may further comprise: receiving circuitry for receiving, from the network function service producer, an indication that a first subscription has been established based on the first subscription request, wherein the indication comprises an identifier of the first subscription.

The apparatus may further comprise: receiving circuitry for receiving, from a second network function service consumer, a request for a subscription to said service; comprising circuitry for comprising, in a second request, an indication that both the proxy function and the second network function service consumer are to be indicated by a second access token, the second access token being usable for subscribing to a service on behalf of the second network function service consumer based on the selected mechanism; and signalling circuitry for signalling the second request to the network repository function.

The apparatus may further comprise: receiving circuitry for receiving the second access token from the network repository function; and signalling circuitry for signalling, to the network function service producer, a second subscription request for said service on behalf of the second network function service consumer, the second subscription request comprising the second access token and an identifier of the first subscription.

The apparatus may further comprise: comprising circuitry for comprising, in the second subscription request, a header and/or flag in a header that explicitly indicates that said subscription request relates to enhancing the first subscription with more recipients of subscription notifications.

When the network function service producer is determined to be unable to use an access token for subscribing to a service that indicates a plurality of entities, the requesting circuitry may further comprise: comprising circuitry for comprising, in a first request, an indication that the first network function service consumer is to be indicated by the first access token; comprising circuitry for comprising, in a second request, an indication that the proxy function is to be indicated by a second access token; and signalling circuitry for signalling the first and second requests to the network repository function.

The apparatus may further comprise: receiving circuitry for receiving respective first and second access tokens in response to the signalled requests; determining circuitry for determining whether to allow a subscription to be established in dependence on the first access token; and when it is determined to allow the subscription to be established, signalling circuitry for signalling a first subscription request for a service to the network function service producer, the first subscription request comprising the second access token.

The apparatus may further comprise: receiving circuitry for receiving, from a second network function service consumer, a request for a subscription to said service; comprising circuitry for comprising, in a third request, an indication that the second network function service consumer is to be indicated by a third access token, the third access token being usable for subscribing to a service on behalf of the second network function service consumer based on the selected mechanism; and signalling circuitry for signalling the third request to the network repository function.

The apparatus may further comprise: receiving circuitry for receiving the third access token in response to the signalled request; determining circuitry for determining whether to allow a subscription to be established in dependence on the third access token; and when it is determined to allow the subscription to be established, forwarding circuitry for forwarding received subscription information to both the first and second network function consumers.

The apparatus may further comprise: registering circuitry for registering profile information for the proxy function at the network repository information, wherein the profile information indicates whether the proxy function is able to allow subscription requests to proceed for a plurality of consumer network functions.

According to an eleventh aspect, there is provided an apparatus for a network repository function, the apparatus comprising: receiving circuitry for receiving, from a network function service producer, an indication of whether the network function service producer is able to use an access token for subscription to a service that indicates a plurality of entities; storing circuitry for storing profile information for the network function service producer, the profile information comprising said indication; receiving circuitry for receiving, from a proxy function, a request for the profile information; and providing circuitry for providing the profile information to the proxy function.

The received indication may be an implicit indication.

The received indication may be an explicit indication.

The apparatus may further comprise: receiving circuitry for receiving, from the proxy function, a request for a first access token for subscribing to a service provided by the network function service producer, the request for the first access token comprising an indication of the proxy function and an indication of a first network function service consumer; generating circuitry for generating the first access token, the first access token comprising an indication of the proxy function and an indication of the first network function service consumer; and providing circuitry for providing the first access token to the proxy function.

The apparatus may further comprise: receiving circuitry for receiving, from the proxy function, a request for a second access token for subscribing to a service provided by the network function service producer, the request for the second access token comprising an indication of the proxy function and an indication of a second network function service consumer; generating circuitry for generating the second access token, the second access token comprising an indication of the proxy function and an indication of the second network function service consumer; and providing circuitry for providing the second access token to the proxy function.

The apparatus may further comprise: receiving circuitry for receiving, from the proxy function, a request for a first access token for subscribing to a service provided by the network function service producer, the request for the first access token comprising an indication of an indication of a first network function service consumer; generating circuitry for generating the first access token, the first access token comprising an indication of the first network function service consumer; receiving circuitry for receiving, from the proxy function, a request for a second access token for subscribing to a service provided by the network function service producer, the request for the second access token comprising an indication of the proxy function; generating circuitry for generating the second access token, the second access token comprising an indication of the proxy function; and providing circuitry for providing the first and second access tokens to the proxy function.

The apparatus may further comprise: receiving circuitry for receiving, from the proxy function, a request for a third access token for subscribing to a service provided by the network function service producer, the request for the third access token comprising an indication of a second network function service consumer; generating circuitry for generating the third access token, the third access token comprising an indication of the second network function service consumer; and providing circuitry for providing the third access token to the proxy function.

The apparatus may further comprise: registering circuitry for registering profile information for the proxy function, wherein the profile information indicates whether the proxy function is able to allow subscription requests to proceed for a plurality of consumer network functions.

According to a twelfth aspect, there is provided an apparatus for a network function, the apparatus comprising: signalling circuitry for signalling, to a network repository function, a request to register profile information for the network function at the network repository function, wherein the request to register comprises an indication of whether the network function is able to, when operating as a network function service producer, use an access token for subscription to a service that indicates a plurality of entities.

The apparatus may further comprise: receiving circuitry for receiving, from a proxy function, a first subscription request for providing a service on behalf of a first network function service consumer, the first subscription request comprising a first access token that indicates both the first network function service consumer and the proxy function; establishing circuitry for establishing a first subscription in response to authorizing the subscription request using the first access token, the first subscription being associated with a first subscription identifier; and providing circuitry for providing the proxy function with the first subscription identifier.

The apparatus may further comprise: receiving circuitry for receiving, from the proxy function, a second subscription request for providing the service on behalf of a second network function service consumer, the second subscription request comprising a second access token that indicates both the second network function service consumer and the proxy function, the first subscription identifier, and a header and/or flag in a header that explicitly indicates that said subscription request relates to enhancing the first subscription with more recipients of subscription notifications.

According to a thirteenth aspect, there is provided non-transitory computer readable medium comprising program instructions for causing an apparatus for a proxy function to perform at least the following: receive, from a network repository function, profile information relating to a network function service producer: determine from the profile information whether the network function service producer is able to use an access token for subscribing to a service that indicates a plurality of entities; select a mechanism for requesting an access token for subscribing to a service in dependence on the determination; and request, from the network repository function, a first access token for subscribing to a service on behalf of a first network function service consumer based on the selected mechanism.

When the network function service producer is determined to be able to use an access token for subscribing to a service that indicates a plurality of entities, the requesting may further comprise: comprising in a first request an indication that both the proxy function and the first network function service consumer are to be indicated by the first access token; and signalling the first request to the network repository function.

The apparatus may further be caused to: receive the first access token from the network repository function; and signal, to the network function service producer, a first subscription request for said service on behalf of the first network function service consumer, the first subscription request comprising the first access token.

The apparatus may further be caused to: receive, from the network function service producer, an indication that a first subscription has been established based on the first subscription request, wherein the indication comprises an identifier of the first subscription.

The apparatus may further be caused to: receive, from a second network function service consumer, a request for a subscription to said service; comprising, in a second request, an indication that both the proxy function and the second network function service consumer are to be indicated by a second access token, the second access token being usable for subscribing to a service on behalf of the second network function service consumer based on the selected mechanism; and signal the second request to the network repository function.

The apparatus may further be caused to: receive the second access token from the network repository function; and signal, to the network function service producer, a second subscription request for said service on behalf of the second network function service consumer, the second subscription request comprising the second access token and an identifier of the first subscription.

The apparatus may further be caused to: comprise, in the second subscription request, a header and/or flag in a header that explicitly indicates that said subscription request relates to enhancing the first subscription with more recipients of subscription notifications.

When the network function service producer is determined to be unable to use an access token for subscribing to a service that indicates a plurality of entities, the requesting may further comprise: comprising, in a first request, an indication that the first network function service consumer is to be indicated by the first access token; comprising, in a second request, an indication that the proxy function is to be indicated by a second access token; and signalling the first and second requests to the network repository function.

The apparatus may further be caused to: receive respective first and second access tokens in response to the signalled requests; determine whether to allow a subscription to be established in dependence on the first access token; and when it is determined to allow the subscription to be established, signal a first subscription request for a service to the network function service producer, the first subscription request comprising the second access token.

The apparatus may further be caused to: receive, from a second network function service consumer, a request for a subscription to said service; comprising, in a third request, an indication that the second network function service consumer is to be indicated by a third access token, the third access token being usable for subscribing to a service on behalf of the second network function service consumer based on the selected mechanism; and signal the third request to the network repository function.

The apparatus may further be caused to: receive the third access token in response to the signalled request; determine whether to allow a subscription to be established in dependence on the third access token; and when it is determined to allow the subscription to be established, forward received subscription information to both the first and second network function consumers.

The apparatus may further be caused to: register profile information for the proxy function at the network repository information, wherein the profile information indicates whether the proxy function is able to allow subscription requests to proceed for a plurality of consumer network functions.

According to a fourteenth aspect, there is provided non-transitory computer readable medium comprising program instructions for causing an apparatus for a network repository function to perform at least the following: receive, from a network function service producer, an indication of whether the network function service producer is able to use an access token for subscription to a service that indicates a plurality of entities; store profile information for the network function service producer, the profile information comprising said indication; receive, from a proxy function, a request for the profile information; and provide the profile information to the proxy function.

The received indication may be an implicit indication.

The received indication may be an explicit indication.

The apparatus may further be caused to: receive, from the proxy function, a request for a first access token for subscribing to a service provided by the network function service producer, the request for the first access token comprising an indication of the proxy function and an indication of a first network function service consumer; generate the first access token, the first access token comprising an indication of the proxy function and an indication of the first network function service consumer; and provide the first access token to the proxy function.

The apparatus may further be caused to: receive, from the proxy function, a request for a second access token for subscribing to a service provided by the network function service producer, the request for the second access token comprising an indication of the proxy function and an indication of a second network function service consumer; generate the second access token, the second access token comprising an indication of the proxy function and an indication of the second network function service consumer; and provide the second access token to the proxy function.

The apparatus may further be caused to: receive, from the proxy function, a request for a first access token for subscribing to a service provided by the network function service producer, the request for the first access token comprising an indication of an indication of a first network function service consumer; generate the first access token, the first access token comprising an indication of the first network function service consumer; receive, from the proxy function, a request for a second access token for subscribing to a service provided by the network function service producer, the request for the second access token comprising an indication of the proxy function; generate the second access token, the second access token comprising an indication of the proxy function; and provide the first and second access tokens to the proxy function.

The apparatus may further be caused to: receive, from the proxy function, a request for a third access token for subscribing to a service provided by the network function service producer, the request for the third access token comprising an indication of a second network function service consumer; generate the third access token, the third access token comprising an indication of the second network function service consumer; and provide the third access token to the proxy function.

The apparatus may further be caused to: register profile information for the proxy function, wherein the profile information indicates whether the proxy function is able to allow subscription requests to proceed for a plurality of consumer network functions.

According to a fifteenth aspect, there is provided non-transitory computer readable medium comprising program instructions for causing an apparatus for a network function to perform at least the following: signal, to a network repository function, a request to register profile information for the network function at the network repository function, wherein the request to register comprises an indication of whether the network function is able to, when operating as a network function service producer, use an access token for subscription to a service that indicates a plurality of entities.

The apparatus may further be caused to: receive, from a proxy function, a first subscription request for providing a service on behalf of a first network function service consumer, the first subscription request comprising a first access token that indicates both the first network function service consumer and the proxy function; establish a first subscription in response to authorizing the subscription request using the first access token, the first subscription being associated with a first subscription identifier; and provide the proxy function with the first subscription identifier.

The apparatus may further be caused to: receive, from the proxy function, a second subscription request for providing the service on behalf of a second network function service consumer, the second subscription request comprising a second access token that indicates both the second network function service consumer and the proxy function, the first subscription identifier, and a header and/or flag in a header that explicitly indicates that said subscription request relates to enhancing the first subscription with more recipients of subscription notifications.

According to a sixteenth aspect, there is provided a computer program product stored on a medium that may cause an apparatus to perform any method as described herein.

According to a seventeenth aspect, there is provided an electronic device that may comprise apparatus as described herein.

According to a nineteenth aspect, there is provided a chipset that may comprise an apparatus as described herein.

BRIEF DESCRIPTION OF FIGURES

Examples will now be described, by way of example only, with reference to the accompanying Figures in which:

Figure 1A:
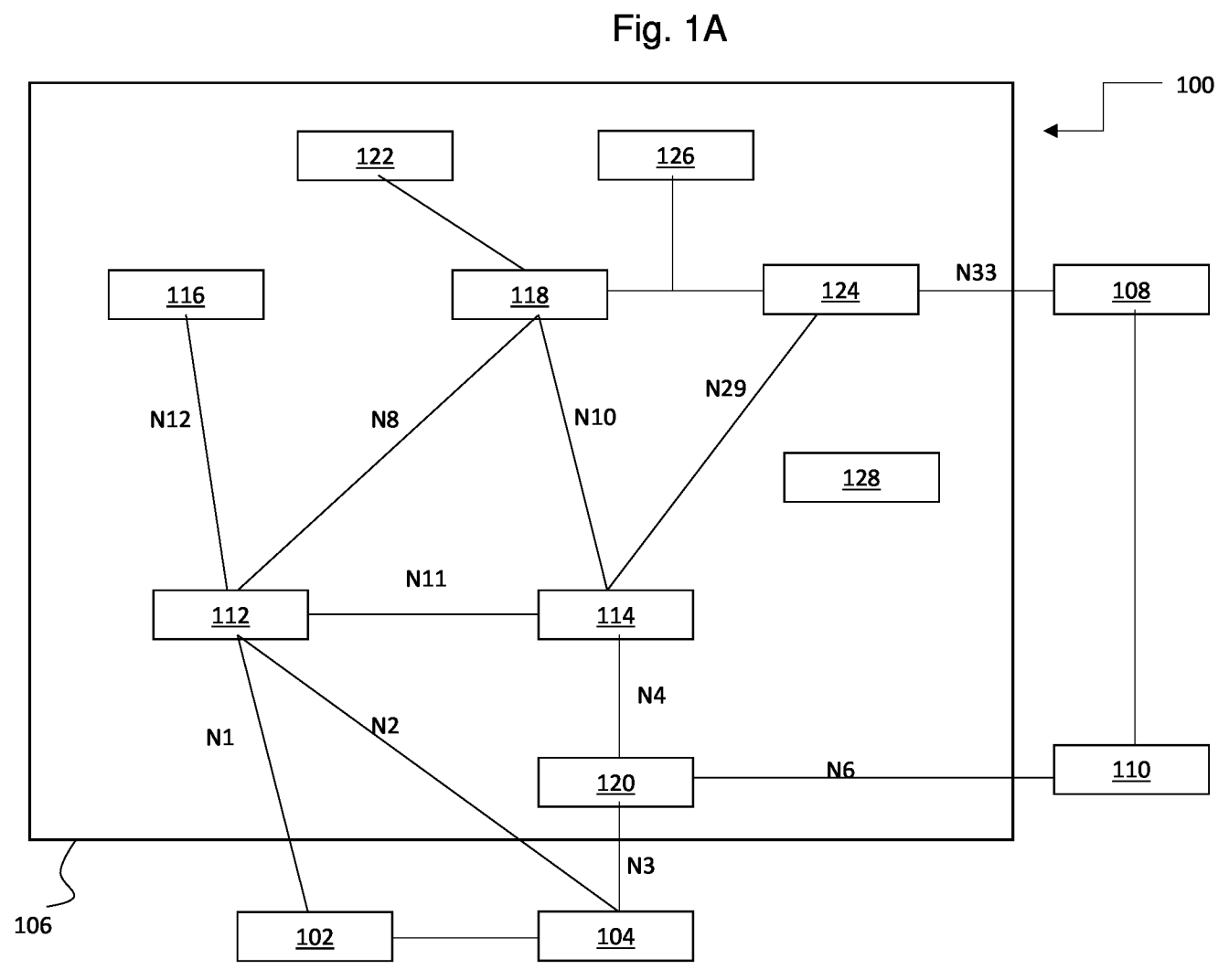

FIGS. 1A and 1B show a schematic representation of a 5G system;

FIG. 5 shows a schematic representation of a network;

DETAILED DESCRIPTION

Figure 1B:
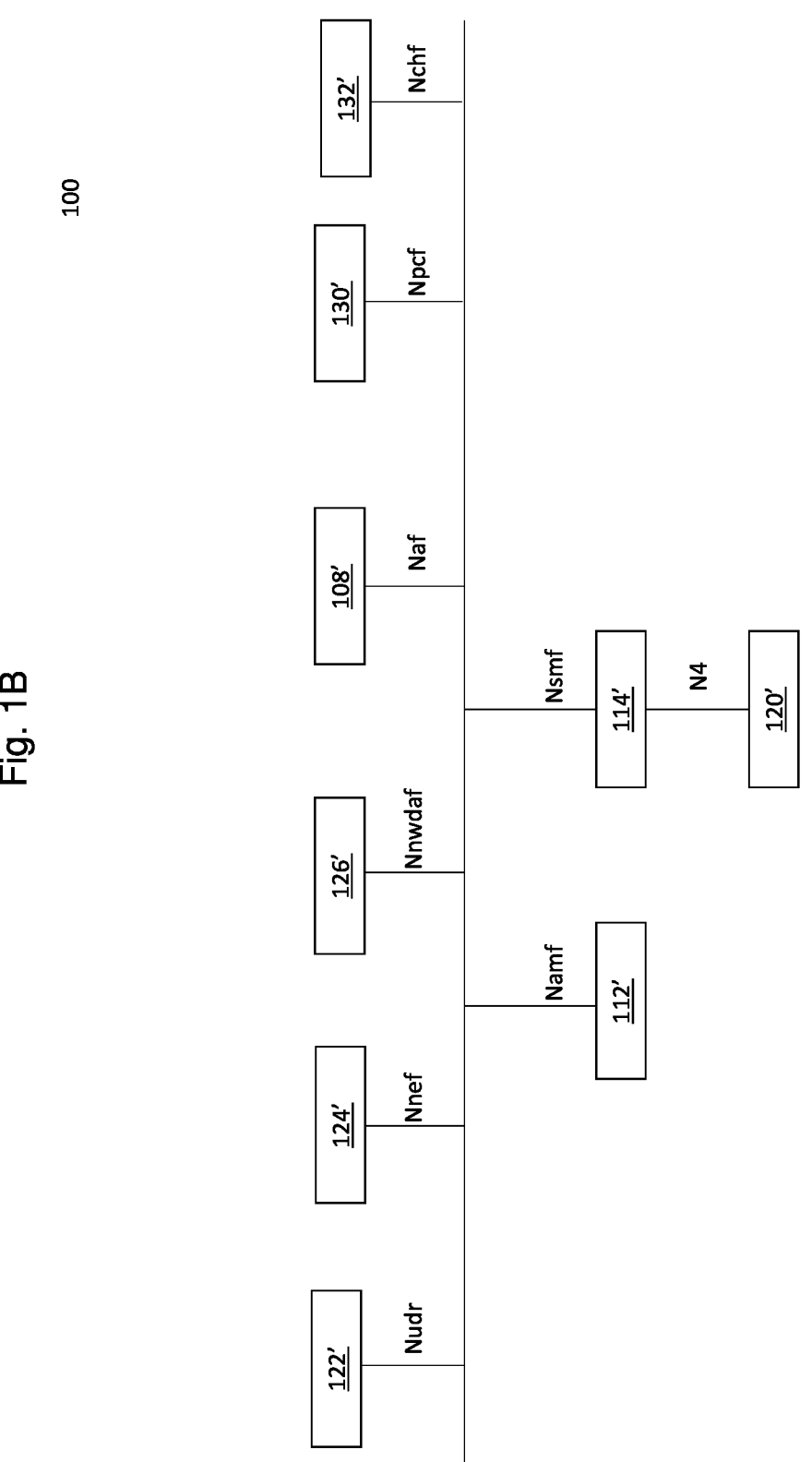

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIGS. 1A and 1B.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, etc.) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS). The MDAS may provide data analytics of different network related parameters including for example load level and/or resource utilisation. For example, the MDAS for a network function (NF) can collect the NF's load related performance data, e.g., resource usage status of the NF. The analysis of the collected data may provide forecast of resource usage information in a predefined future time. This analysis may also recommend appropriate actions e.g., scaling of resources, admission control, load balancing of traffic, etc.

FIG. 1B shows a schematic representation of a 5GC 106' represented in current 3GPP specifications.

FIG. 1B shows a UPF 120' connected to an SMF 114' over an N4 interface. The SMF 114' is connected to each of a UDR 122', an NEF 124', an NWDAF 126', an AF 108', a Policy Control Function (PCF) 130', an AMF 112', and a Charging function 132' over an interconnect medium that also connects these network functions to each other.

3GPP refers to a group of organizations that develop and release different standardized communication protocols. 3GPP is currently developing and publishing documents related to Release 16, relating to 5G technology, with Release 17 currently being scheduled for 2022.

One of the elements defined by 3GPP is a Data Collection Coordination and Delivery Function (DCCF). The role of the DCCF is to coordinate the collection and distribution of data requested by NF service consumers. The DCCF may thus help to prevent duplication of tasks by preventing data sources from having to handle multiple subscriptions for the same data and sending multiple notifications containing the same information due to uncoordinated requests from data consumers.

Some security provisions for Data Collection Coordination Function (DCCF). have already been agreed in 3GPP TR 33.866 to be a part of the normative work. This includes the use of a modified access token comprising multiple subjects that is generated by the NRF. In particular, for DCCFs that are to request subscriptions for a service from an NF service producer on behalf of an NF service consumer, the NRF may generate (and provide to the DCCF) an access token that is unique to the combination of the DCCF and the NF service consumer. In essence, this means that the DCCF may be added as a part of the additional access token claims (representing an additional subject) and not in particular as a part of multiple subjects. Once the DCCF has been provided with the access token that is unique to the combination of the DCCF and the NF service consumer, the DCCF may provide this access token to the NF service producer when requesting the service. The NF service producer may then validate and/or authorize the subscription request using the access token that is unique to the combination of the DCCF and the NF service consumer.

However, these agreed provisions are not compatible with the Release 15 and Release 16 definitions of the NFs as these NFs cannot handle multiple subjects being indicated in an access token when acting as an NF service producer.

Therefore, when the DCCF is deployed with these agreed provisions, the previous generations NFs will have to be upgraded in order to understand the modified access token and to subsequently process the subscription request from the DCCF.

Further, there is no mechanism for the NRF to dynamically generate different types of access token (e.g. the modified access token discussed above or the original access token defined in 3GPP TS 33.501), let alone to do so based upon the release version of the NF producing data.

Further, there is no mechanism for an NF Service Producer to process a request aiming at updating a subscription to include more notification receivers (i.e. to include more entities subscribing to receive the same service as an existing subscription).

The following aims to enhance the existing behavior of at least one entity involved in requesting a subscription.

The following presents different examples showcasing how at least one of the above-mentioned issues may be addressed.

Figure 6:
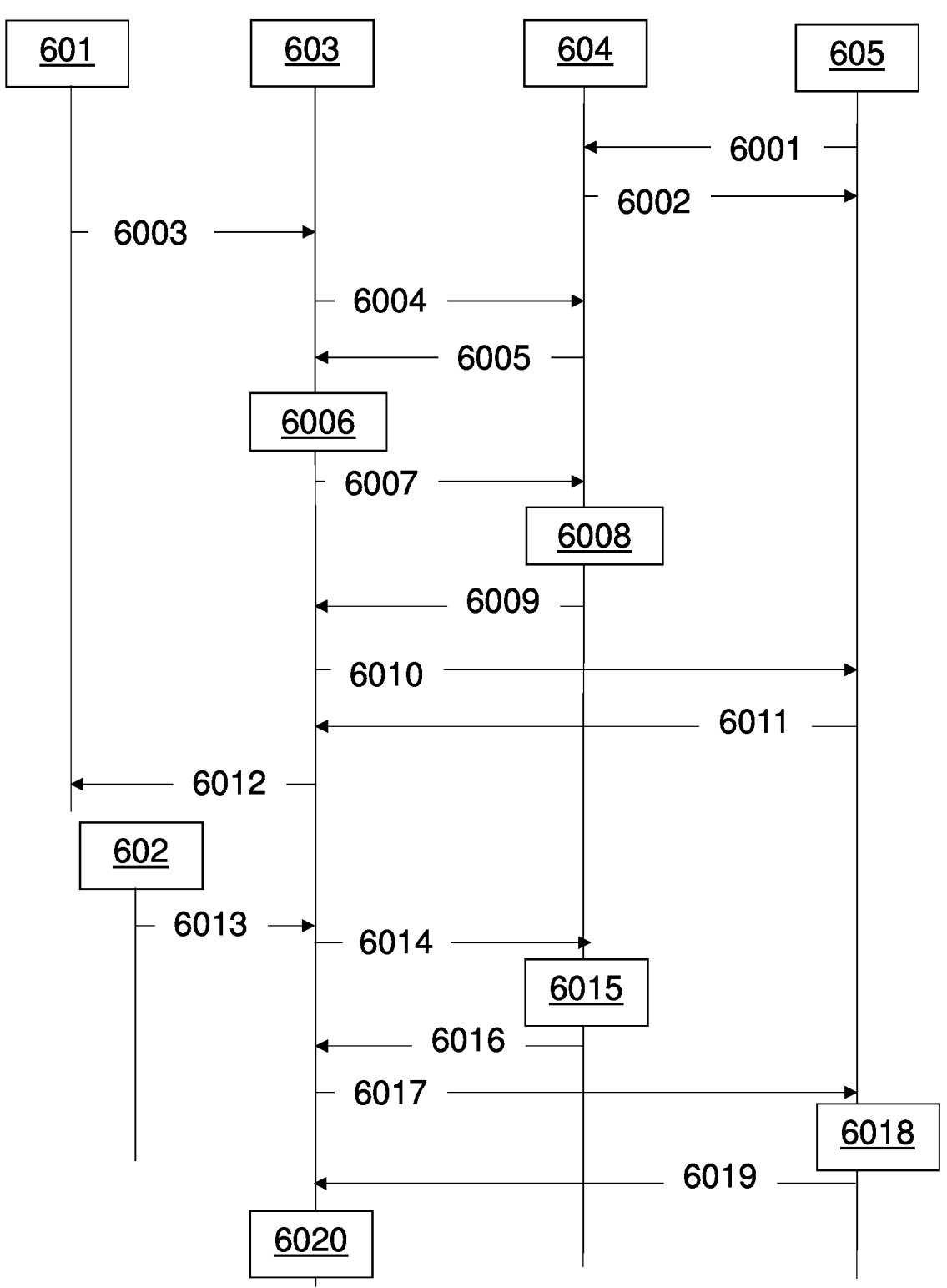
FIGS. 6 and 7 show example signalling diagrams.

In the first example, illustrated with respect to FIG. 6, the illustrated NF service producer is assumed to be able to access the modified access token for authorizing subscription service requests (i.e. they operate using a compatible operating communication protocol for supporting DCCF security functionality). In the second example, illustrated with respect to FIG. 7, the illustrated NF service producer is assumed to be unable to use the modified access token for authorizing subscription service requests (i.e. the NF service producer is not operating a compatible operating communication protocol for supporting DCCF security functionality).

The example of FIG. 6 will be discussed first.

FIG. 6 illustrates potential signalling that may be performed between a first NF service consumer 601, a second NF service consumer 602, a DCCF 603, an NRF 604, and an enhanced NF service producer 605.

At 6001, the NF service producer 605 registers itself with the NRF 604 by signalling an NF profile registration request. This registration request may comprise an indication that the NF service producer 605 supports enhanced token verification.

At 6002, the NRF 604, having registered the NF service producer 605 on receipt of the request of 6001, signals an indication to the NF service producer 605 that indicates that the registration has been successfully performed.

6003 to 6006 relate to the first NF service consumer 601 subscribing to receive data via the DCCF 603.

At 6003, the first NF service consumer 601 signals the DCCF 603. This signalling may comprise a request to subscribe to data from at least one NF service producer. The NF service producer may be specified. The NF service producer may be unspecified. When the NF service producer is unspecified, the DCCF may be configured to select at least one NF service producer for serving the subscription request of the first NF service consumer. This signalling of 6003 may be labelled at Ndccf_DataManagement_SubscriberNFpDataCollection.

At 6004, the DCCF 603 signals the NRF 604. This signalling of 6004 may be performed in response to receipt of the signalling of 6003. This signalling of 6004 may be performed as part of a discovery process for discovering the NF service producer 605 and/or for obtaining profile information for the NF service producer 605.

At 6005, the NRF 604 responds to the signalling of 6004. This response may comprise NF profile information for the NF service producer 605. This profile information may comprise an indication that the NF service producer 605 supports token verification for access tokens comprising multiple subjects (e.g. both the first NF service consumer 601 and the DCCF 603).

At 6006, the DCCF 603 uses the profile information provided during 6005 to determine whether the NF service producer is an enhanced NF service producer and will consequently support additional subjects within a same access token. The subjects may be, for example, the DCCF 603 and the first NF service consumer 601.

At 6007, the DCCF 603 signals an access token request on behalf of the first NF service consumer 601 to the NRF 604. This access token request may indicate two separate consumers. For example, this access token request may comprise an indication that the DCCF 603 is a consumer, and that the first NF service consumer 601 is a consumer. This may be indicated by indicating the first NF service consumer is the 'subject', and the DCCF 603 is an "additional subject". The request may comprise identifiers for the indicated consumers.

At 6008, the NRF 604 may determine that the NF service producer 605 supports multiple subjects being indicated in a same access token. This may be determined by examining the profile information for the NF service producer 605 that is stored at the NRF 604.

At 6009, the NRF 604 signals an access token for the DCCF 603 and the first NF service consumer 601 to the DCCF 603. This access token may indicate that both the DCCF 603 and the first NF service consumer 601 are associated with the access token. In other words, the access token may be an enhanced access token, as discussed above.

At 6010, the DCCF 603 signals a subscription request to the NF service producer 605. This subscription request may comprise the token for the DCCF 603 and the first NF service consumer 601. The at least one token may be comprised within, for example, an authorization header.

At 6011, the NF service producer 605 responds to the subscription request of 6010 with an indication that the subject has been authorized. This signalling of 6011 may comprise an indication that a first subscription identifier has been created. This first subscription identifier may be comprised within the signalling of 6011.

At 6012, the DCCF 603 signals the first NF service consumer 601 to indicate that the requested subscription has been successfully created.

6013 to 6020 relate to the second NF service consumer 602 requesting a subscription to the same data as subscribed by the first NF service consumer 601.

At 6013, the second NF service consumer 602 signals the DCCF 603. This signalling may comprise a request to subscribe to data from at least one NF service producer. The NF service producer may be specified. The NF service producer may be unspecified. When the NF service producer is unspecified, the DCCF may be configured to select at least one NF service producer for serving the subscription request of the first NF service consumer. This signalling of 6013 may be labelled at Ndccf_DataManagement_SubscriberNFpDataCollection.

At 6014, the DCCF 603 signals the NRF 604. This signalling of 6014 may be performed in response to receipt of the signalling of 6013. This signalling of 6014 may comprise an access token request on behalf of the second NF service consumer 602 to the NRF 604. This access token request may indicate two separate consumers. For example, this access token request may comprise an indication that the DCCF 603 is a consumer, and that the second NF service consumer 602 is a consumer. This may be indicated by indicating the second NF service consumer is the 'subject', and the DCCF 603 is an "additional subject". The request may comprise identifiers for the indicated consumers. 6014 assumes that the DCCF 603 retains the information that the NF service producer 605 allows multiple subjects. It is understood that if the DCCF 603 did not retain this information, the DCCF 603 may obtain it from the NRF via a new discovery procedure.

At 6015, the NRF 604 may determine that the NF service producer 605 supports multiple subjects. This may be determined by examining the profile information for the NF service producer 605 that is stored at the NRF 604.

At 6016, the NRF 604 signals an access token for the DCCF 603 and the second NF service consumer 602 to the DCCF 603. This access token may indicate that both the DCCF 603 and the second NF service consumer 602 are associated with the access token. In other words, the access token may be a modified access token, as discussed above.

At 6017, the DCCF 603 signals a subscription update request to the NF service producer 605. This subscription update request may comprise the access token for the DCCF 603 and the second NF service consumer 602. The access token may be comprised within, for example, an authorization header. The signalling of 6017 may comprise an indication that the DCCF is able to request the enhanced subscription. This indication that the DCCF is able to request the enhanced subscription may be an explicit indication. The explicit indication may be comprised, for example, within a custom header and/or flag. This new custom header/flag may be labelled as 3GPP-Sbi-Subscription-Enhancement.

The signalling of 6017 may comprise the first subscription identifier.

At 6018, the NF service producer 605 performs authorization for the subscription based on only the token(s) comprised in the signalling of 6017 and without reference to token(s) used for the existing subscription of the first subscription identifier. The new custom header/flag comprised in the signalling of 6017 may trigger the NF service producer 605 to enhance an existing subscription. This may cause the NF service producer 605 to validate the provided token and also perform any needed application level checks to allow the subscription to be enhanced with more recipients of notifications. From the NF service producer 605 perspective, notifications are still sent to the same notification endpoint provided to NF service producer 605 by the DCCF upon the creation of the first subscription.

At 6019, the NF service producer 605 responds to the subscription update request of 6017. When the subscription update has been approved following a successful authorization in 6018, the NF service producer 605 signals at 6019 to indicate that the subscription has been updated. When the subscription update has not been approved following an unsuccessful authorization at 6018, the NF service producer 605 signals at 6019 to indicate that the subscription has not been updated.

At 6020, the DCCF 603 determines whether to allow or reject services to the second NF service consumer 602 in dependence on the signalling received at 6019. In particular, when the indication received during 6019 indicates that the subscription has been updated, the DCCF 603 determines to signal (and subsequently signals) the second NF service consumer 602 to allow the subscription request of 6013. Further, when the indication received during 6019 indicates that the subscription has not been updated, the DCCF 603 determines to signal (and subsequently signals) the second NF service consumer 602 to deny the subscription request of 6013.

Figure 7:
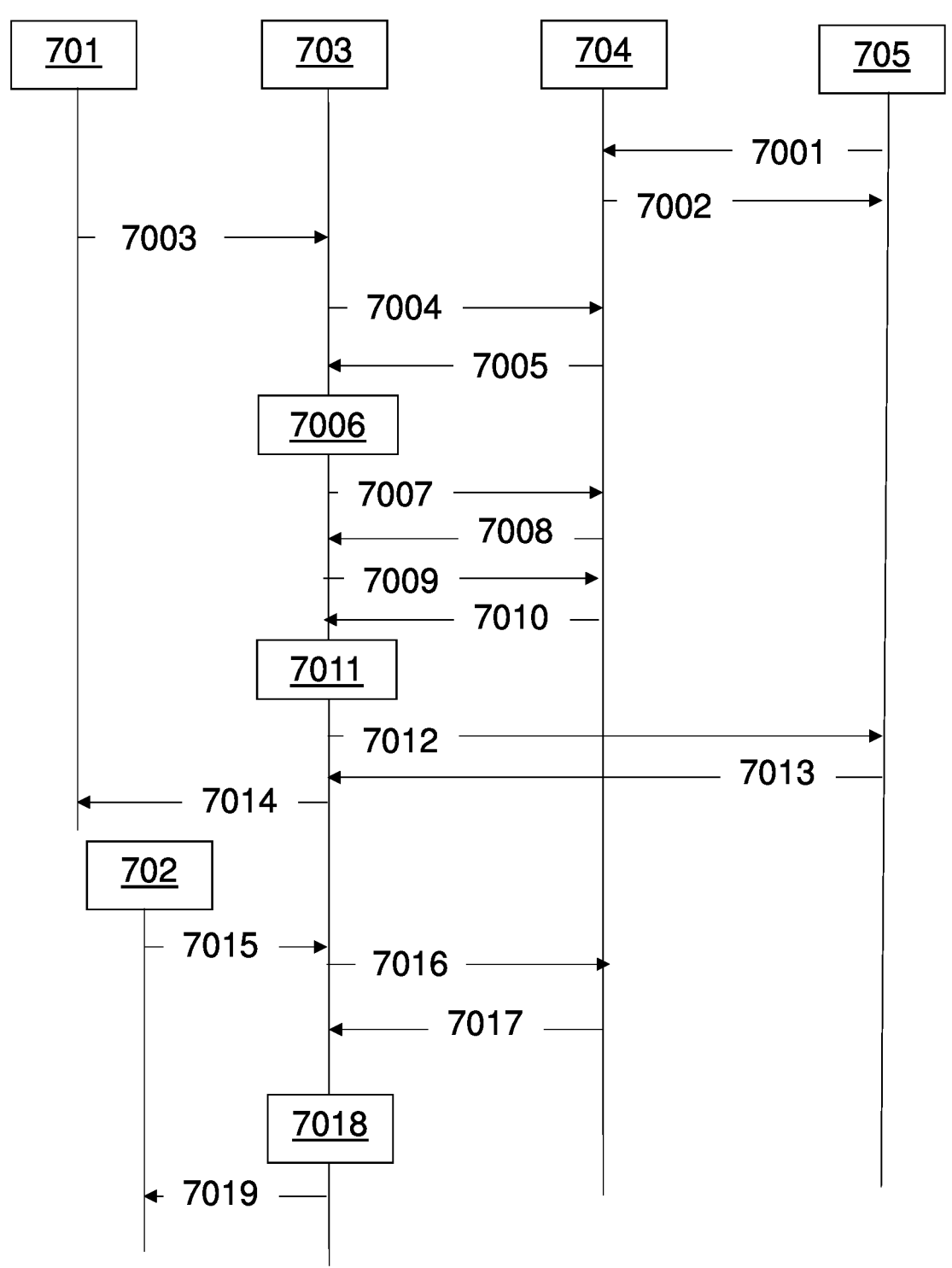

The example of FIG. 7 is now discussed. In the example of FIG. 7, the DCCF 703 requests a subscription on behalf of NF service consumers using its own unique access token. A unique access token in the present sense may be considered to be an access token that indicates that the DCCF is a subject of the access token, that does not indicate that any other network function is a subject of the access token. So that security features are still being implemented, the DCCF may be configured to independently authorize the NF service consumers, and to only signal a subscription request to an NF service producer when the NF service consumer has been successfully authorized for that subscription request.

FIG. 7 illustrates potential signalling that may be performed between a first NF service consumer 701, a second NF service consumer 702, a DCCF 703, an NRF 704, and an NF service producer 705.

At 7001, the NF service producer 705 registers itself with the NRF 704 by signalling an NF profile registration request. This registration request may comprise an indication that the NF service producer 705 does not support enhanced token verification. This indication may be provided implicitly. For example, this indication may be provided by the absence of an explicit indication that enhanced token verification is supported.

At 7002, the NRF 704, having registered the NF service producer 705 on receipt of the request of 7001, signals an indication to the NF service producer 705 that indicates that the registration has been successfully performed.

7003 to 7010 relate to the first NF service consumer 701 subscribing to receive data via the DCCF 703.

At 7003, the first NF service consumer 701 signals the DCCF 703. This signalling may comprise a request to subscribe to data from at least one NF service producer. The NF service producer may be specified. The NF service producer may be unspecified. When the NF service producer is unspecified, the DCCF may be configured to select at least one NF service producer for serving the subscription request of the first NF service consumer. This signalling of 7003 may be labelled at Ndccf_DataManagement_SubscriberNFpDataCollection.

At 7004, the DCCF 703 signals the NRF 704. This signalling of 7004 may be performed in response to receipt of the signalling of 7003. This signalling of 7004 may be performed as part of a discovery process for discovering the NF service producer 705 and/or for obtaining profile information for the NF service producer 705.

At 7005, the NRF 704 responds to the signalling of 7004. This response may comprise NF profile information for the NF service producer 705. This profile information may comprise an indication that the NF service producer 705 does not support enhanced token verification. This indication of 7005 may be an explicit indication that the NF service producer 705 does not support enhanced token verification. This indication of 7005 may be an implicit indication that the NF service producer 705 does not support enhanced token verification. For example, an implicit indication may be provided by the absence of an explicit indication that enhanced token verification is supported.

At 7006, the DCCF 703 uses the profile information provided during 7005 to determine whether the NF service producer is not an enhanced NF service producer and will consequently support additional subjects. The subjects may be, for example, the DCCF 703 and the first NF service consumer 701.

At 7007, the DCCF 703 signals an access token request on behalf of the first NF service consumer 701 to the NRF 704. This access token request may only indicate the first NF service consumer 701 as being a consumer. In other words, the access token request of 7007 may not indicate that the DCCF 703 is a consumer.

At 7008, the NRF 704 provides an access token for the first NF service consumer 701 to the DCCF 703. This access token is unique for the first NF service consumer 701 and so is not used for access by another consumer.

At 7009, the DCCF 703 signals an access token request on behalf of the first NF service consumer 701 to the NRF 704. This access token request may only indicate the DCCF 703 as being a consumer. In other words, the access token request of 7009 may not indicate that the first NF service consumer 701 is a consumer.

At 7010, the NRF 704 provides an access token for the DCCF 703 to the DCCF 703. This access token is unique for the DCCF 703.

At 7011, the DCCF 703 validates the access token received on behalf of the first NF service consumer in 7008. When the access token is successfully validated at 7011, then the DCCF 704 proceeds to 7012. When the access token is not successfully validated at 7011, the DCCF 704 informs the first NF service consumer 701 that the subscription request has been unsuccessful (not shown).

At 7012, the DCCF 703 signals a subscription request to the NF service producer 705. This subscription request may comprise an authorization header comprising the token for the DCCF received in 7010.

At 7013, the NF service producer 705 provides the DCCF 703 with a subscription identity for the subscription requested in 7012. This signalling of 7013 indicates that the access token has been authorized and that the subscription service will be provided by the NF service producer 705.

At 7014, the DCCF 703 signals the first NF service consumer 701 to indicate that the subscription has been successfully established.

At 7015, the second NF service consumer signals the DCCF 703. This signalling may comprise a request to subscribe to data from at least one NF service producer. The NF service producer may be specified. The NF service producer may be unspecified. When the NF service producer is unspecified, the DCCF may be configured to select at least one NF service producer for serving the subscription request of the second NF service consumer. This signalling of 7015 may be labelled at Ndccf_DataManagement_SubscriberNFpDataCollection.

At 7016, the DCCF 703 signals the NRF 704. This signalling of 7016 may be performed in response to receipt of the signalling of 7015. This signalling of 7016 may comprise an access token request on behalf of the second NF service consumer 702 to the NRF 604. This access token request may indicate only that the second NF service consumer 702 is a consumer. In other words, this access token request of 7016 does not indicate that the DCCF 703 is to be a consumer.

At 7017, the NRF 704 provides the DCCF 703 with an access token for the second NF service consumer 702. This access token is unique for the second NF service consumer 702 and so is not used for access for another consumer.

At 7018, the DCCF 703 validates the access token received at 7017. When the access token is successfully validated at 7018, then the DCCF 704 proceeds to 7019. When the access token is not successfully validated at 7018, the DCCF 704 informs the second NF service consumer 702 that the subscription request has been unsuccessful (not shown).

At 7019, the DCCF 703 signals the second NF service consumer 702 to indicate that the requested subscription of 7015 has been successfully established. The DCCF 703 does not signal a new subscription request to the NF service producer 705. Instead, when the DCCF 703 receives subscription-related information for the subscription set up during 7012 to 7013, the DCCF 703 forwards this subscription-related information to both the first and the second NF service consumers.

In the above examples of FIGS. 6 and 7, the DCCF may have registered its own profile at the NRF. This registered DCCF profile may indicate that the DCCF can request access tokens on behalf of other NF service consumers in case the target NF service producer is not Rel 17. This is particularly useful in the example of FIG. 7. This is because when the NRF receives the access token request from DCCF (and the NRF knows that the NF Service Producer for which the access token is requested does not accept multiple subjects in a same access token (i.e. the NF service producer is Rel 15, or Rel 16)), the NRF may be enhanced to accept the access token request received from DCCF even though the request parameters provide the first NF service consumer (or the second NF service consumer) as the source.

Figures 8, 9, 10:
FIGS. 8 to 10 are flow charts illustrating potential operations that may be performed by apparatus described herein.

FIGS. 8 to 10 illustrate potential operations that may be performed by apparatus described herein. It is understood that the apparatus of FIGS. 8 to 10 may interact with each other. It is further understood that the apparatus of FIGS. 8 to 10 may perform operations described above with respect to the examples of FIGS. 6 and 7.

FIG. 8 illustrates operations that may be performed by an apparatus for a proxy function. The proxy function may be configured to manage subscription requests on behalf of a plurality of network function service consumers. The proxy function may be a DCCF. However, it is understood that other network entities that is enabled to handle subscription requests for a network function service producer on behalf of multiple network function service consumers may also perform the presently disclosed techniques.

At 801, the apparatus receives, from a network repository function, profile information relating to a network function service producer. This profile information may have been transmitted to the apparatus following the apparatus signalling a discovery request to the network repository function to discover the network function service producer.

At 802, the apparatus determines from the profile information whether the network function service producer is able to use an access token for subscribing to a service that indicates a plurality of entities. In other words, the apparatus determines whether or not the network function service producer is able to use enhanced tokens or not. This information may be indicated implicitly in the received profile information (e.g. by the absence of an explicit indication that the network function service producer is able to use enhanced tokens). This information may be indicated explicitly in the received profile information.

At 803, the apparatus selects a mechanism for requesting an access token for subscribing to a service in dependence on the determination.

At 804, the apparatus requests, from the network repository function, a first access token for subscribing to a service on behalf of a first network function service consumer based on the selected mechanism.

When the network function service producer is determined to be able to use an access token for subscribing to a service that indicates a plurality of entities, the apparatus may comprise, in a first request, an indication that both the proxy function and the first network function service consumer are to be indicated by the first access token, and signal the first request to the network repository function. This may form at least part of the selected mechanism.

The apparatus may receive the first access token from the network repository function and signal, to the network function service producer, a first subscription request for said service on behalf of the first network function service consumer, the first subscription request comprising the first access token.

The apparatus may receive, from the network function service producer, an indication that a first subscription has been established based on the first subscription request, wherein the indication comprises an identifier of the first subscription.

Subsequent to this, the apparatus may receive, from a second network function service consumer, a request for a subscription to said service. Following this request form the second network function, the apparatus may comprise, in a second request, an indication that both the proxy function and the second network function service consumer are to be indicated by a second access token, the second access token being usable for subscribing to a service on behalf of the second network function service consumer based on the selected mechanism, and signal the second request to the network repository function.

The apparatus may receive the second access token from the network repository function following the signalling of the second request. The apparatus may signal, to the network function service producer, a second subscription request for said service on behalf of the second network function service consumer, the second subscription request comprising the second access token and an identifier of the first subscription. The apparatus may further comprise, in the second subscription request, a header and/or flag in a header that explicitly indicates that said subscription request relates to enhancing the first subscription with more recipients of subscription notifications.

When the network function service producer is determined to be unable to use an access token for subscribing to a service that indicates a plurality of entities, the apparatus may comprise, in a first request, an indication that the first network function service consumer is to be indicated by the first access token, comprise, in a second request, an indication that the proxy function is to be indicated by a second access token, and signal the first and second requests to the network repository function.

The apparatus may further receive respective first and second access tokens in response to the signalled requests, determine whether to allow a subscription to be established in dependence on the first access token, and, when it is determined to allow the subscription to be established, signal a first subscription request for a service to the network function service producer, the first subscription request comprising the second access token.

The apparatus may further receive, from a second network function service consumer, a request for a subscription to said service following the first subscription request. The apparatus may comprise, in a third request, an indication that the second network function service consumer is to be indicated by a third access token, the third access token being usable for subscribing to a service on behalf of the second network function service consumer based on the selected mechanism, and signal the third request to the network repository function. The apparatus may receive the third access token in response to the signalled request, determine whether to allow a subscription to be established in dependence on the third access token, and, when it is determined to allow the subscription to be established, forward received subscription information to both the first and second network function consumers.

In all of the above examples, the apparatus may further register profile information for the proxy function at the network repository information, wherein the profile information indicates whether the proxy function is able to allow subscription requests to proceed for a plurality of consumer network functions.

FIG. 9 illustrates potential operations that may be performed by an apparatus for a network repository function. The network repository function may be the network repository function discussed above in relation to FIG. 8.

At 901, the apparatus receives, from a network function service producer, an indication of whether the network function service producer is able to use an access token for subscription to a service that indicates a plurality of entities. In other words, the network function service producer may indicate whether or not it may use an enhanced token for subscription services when operating as a network function service producer. This indication may be an implicit indication or an explicit indication. This signalling may be performed as part of a registration procedure to register the network function service producer with the network repository function.

At 902, the apparatus stores profile information for the network function service producer, the profile information comprising said indication. When the network function service producer implicitly indicates that the network function service producer does not use an enhanced access token for subscriptions, this may still be stored in the profile information using an explicit indication.

At 903, the apparatus receives, from a proxy function, a request for the profile information. This request may be signalled as part of a discovery procedure for discovering the network function service producer.

At 904, the apparatus provides the profile information to the proxy function.

The apparatus may receive, from the proxy function, a request for a first access token for subscribing to a service provided by the network function service producer, the request for the first access token comprising an indication of the proxy function and an indication of a first network function service consumer. Following this request, the apparatus may generate the first access token, the first access token comprising an indication of the proxy function and an indication of the first network function service consumer. The apparatus may provide the first access token to the proxy function.

The apparatus may further receive, from the proxy function, a request for a second access token for subscribing to a service provided by the network function service producer, the request for the second access token comprising an indication of the proxy function and an indication of a second network function service consumer. Following this second access token request, the apparatus may generate the second access token, the second access token comprising an indication of the proxy function and an indication of the second network function service consumer, and provide the second access token to the proxy function. The first and second access tokens may each be a single token indicating respective multiple subjects.

The apparatus may receive, from the proxy function, a request for a first access token for subscribing to a service provided by the network function service producer, the request for the first access token comprising an indication of an indication of a first network function service consumer. The apparatus may generate the first access token, the first access token comprising an indication of the first network function service consumer. The apparatus may subsequently receive, from the proxy function, a request for a second access token for subscribing to a service provided by the network function service producer, the request for the second access token comprising an indication of the proxy function. The apparatus may generate the second access token, the second access token comprising an indication of the proxy function. The apparatus may provide the first and second access tokens to the proxy function. It is understood that these first and second access tokens may be provided at the same time or at different times to each other.

The apparatus may receive, from the proxy function, a request for a third access token for subscribing to a service provided by the network function service producer, the request for the third access token comprising an indication of a second network function service consumer, generate the third access token, the third access token comprising an indication of the second network function service consumer, and provide the third access token to the proxy function.

In all of the above examples, the apparatus may register profile information for the proxy function, wherein the profile information indicates whether the proxy function is able to allow subscription requests to proceed for a plurality of consumer network functions.

FIG. 10 illustrates operations that may be performed by an apparatus for a network function. The network function may be the network function service producer discussed in the above examples of FIGS. 8 and 9.

At 1001, the apparatus signals, to a network repository function, a request to register profile information for the network function at the network repository function, wherein the request to register comprises an indication of whether the network function is able to, when operating as a network function service producer, use an access token for subscription to a service that indicates a plurality of entities. In other words, the network function may indicate whether it may use enhanced tokens when operating as a network function service producer. This signalling may be performed as part of a registration procedure to register profile information for the network function at the network repository function.

The apparatus may further receive, from a proxy function, a first subscription request for providing a service on behalf of a first network function service consumer, the first subscription request comprising a first access token that indicates both the first network function service consumer and the proxy function, establish a first subscription in response to authorizing the subscription request using the first access token, the first subscription being associated with a first subscription identifier, and provide the proxy function with the first subscription identifier.

The apparatus may further receive, from the proxy function, a second subscription request for providing the service on behalf of a second network function service consumer, the second subscription request comprising a second access token that indicates both the second network function service consumer and the proxy function, the first subscription identifier, and a header and/or flag in a header that explicitly indicates that said subscription request relates to enhancing the first subscription with more recipients of subscription notifications. The apparatus may authenticate and/or validate the second access token before signalling the result of this authentication and/or validation back to the proxy function. Regardless of whether or not the authentication and/or validation is successful, the apparatus may not change the first subscription (i.e. the subscription set up using the first access token indicating both the first network function service consumer and the proxy function).

Figure 2:
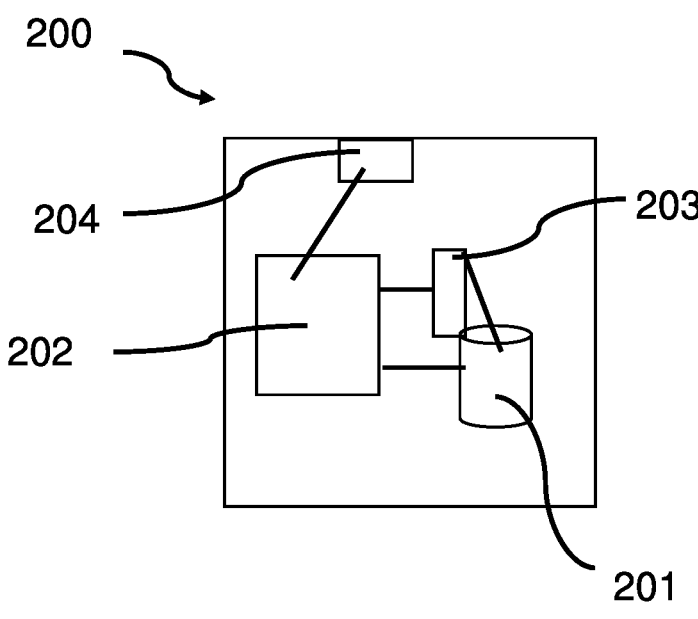
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
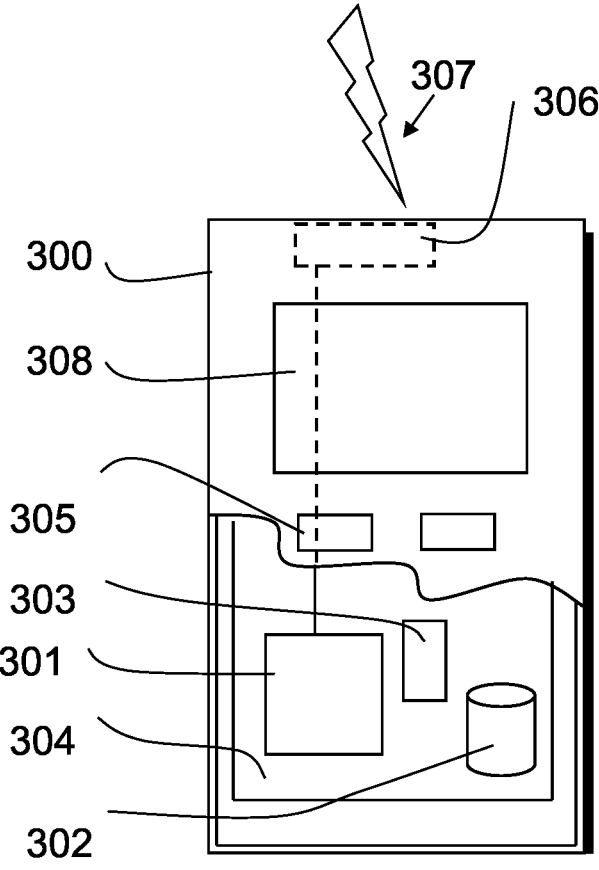
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
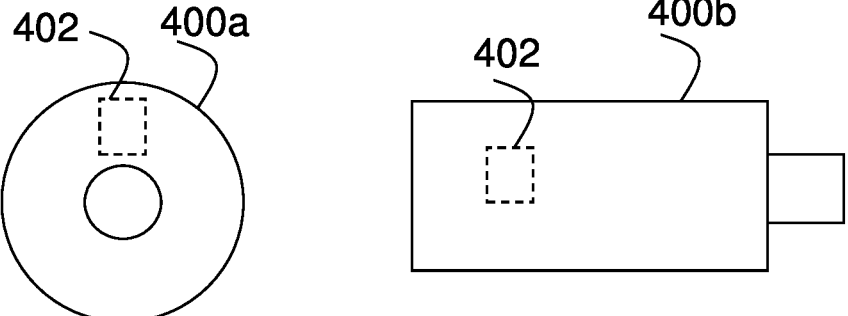
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 8, and/or FIG. 9, and/or FIG. 10.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 8, and/or FIG. 9, and/or FIG. 10 and/or FIG. 11, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally, some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

In the above, different examples are described using, as an example of an access architecture to which the presently described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
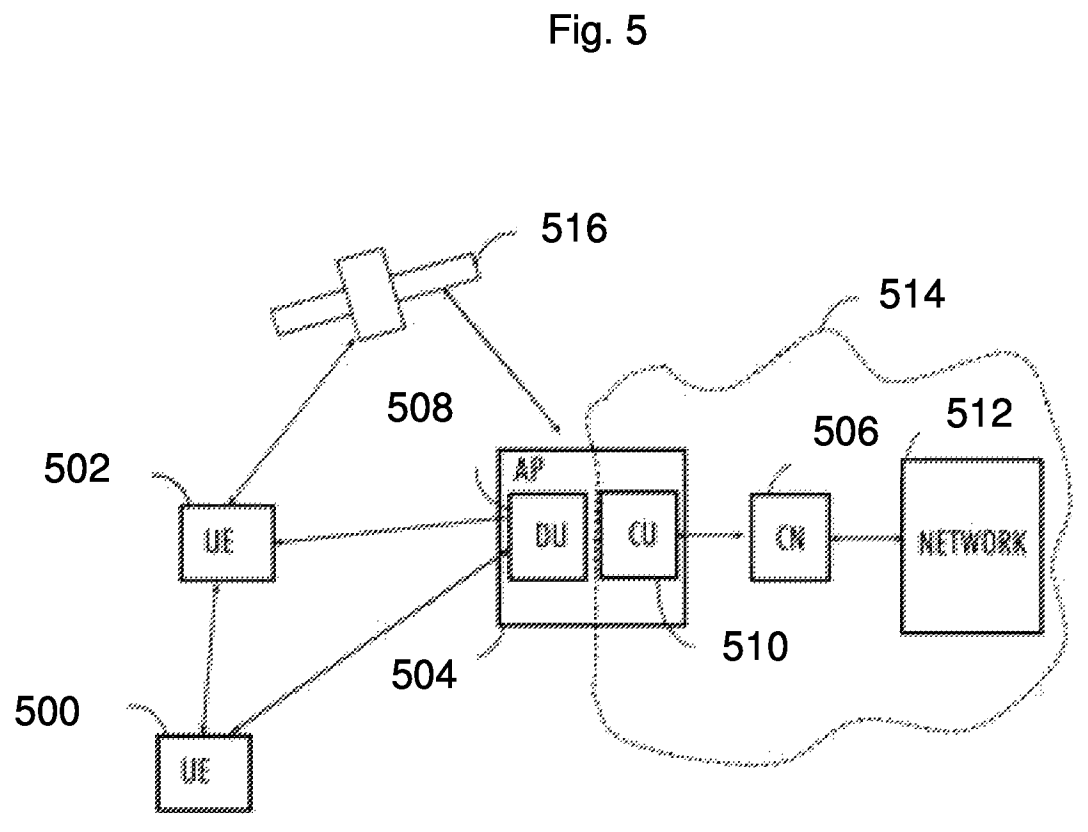

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24

GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 5). A HNB Gateway (HNB-GW), which is typically installed within an operator's network may aggregate traffic from a large number of HNBs back to a core network.

The invention claimed is:

1. An apparatus for a Data Collection Coordination and Delivery Function (DCCF), the apparatus comprising:
   at least one processor,
   at least one memory storing instructions that, when executed by the at least one processor, cause the DCCF at least to:
      receive, from a first network function service consumer, a first service request for a service;
      comprise, in a first access token request, an indication that both the DCCF and the first network function service consumer are to be indicated as service consumers;
      signal, to a network repository function, the first access token request for a first access token authorizing the service provided by a network function service producer to the first network function service consumer and the DCCF;

receive, from the network repository function, the first access token indicating the DCCF and the first network function service consumer; and
      signal, to the network function service producer, a second service request on behalf of the first network function service consumer for the service provided by the network function service producer, the second service request comprising the first access token indicating the DCCF and the first network function service consumer.

2. The apparatus as claimed in claim 1, wherein:
   the DCCF is added as an additional access token claim of the first access token.

3. The apparatus as claimed in claim 1, wherein the DCCF is further caused to:
   receive, from the network function service producer, an indication that the first network function service consumer is authorized for the service.

4. The apparatus as claimed in claim 1, wherein the DCCF is further caused to:
   receive, from a second network function service consumer, a third service request for the service;
   comprise, in a second access token request, an indication that both the DCCF and the second network function service consumer are to be indicated as service consumers; and
   signal, to the network repository function, the second access token request for a second access token authorizing the service provided by the network function service producer to the second network function service consumer and the DCCF.

5. The apparatus as claimed in claim 4, wherein the DCCF is further caused to:
   receive, from the network repository function, the second access token indicating the DCCF and the second network function service consumer; and
   signal, to the network function service producer, fourth service request on behalf of the second network function service consumer for the service provided by the network function service producer, the subscription fourth service request comprising the second access token indicating the DCCF and the second network function service consumer.

6. The apparatus as claimed in claim 5, wherein:
   the DCCF is added as an additional access token claim of the second access token.

7. The apparatus as claimed in claim 1, wherein the DCCF is further caused to:
   select the network function service producer when the network function service producer is unspecified in the first service request.

8. The apparatus as claimed in claim 1, wherein:
   the network function service producer is specified in the first service request.

9. The apparatus as claimed in claim 1, wherein:
   the first access token request comprises identifiers for the DCCF and the first network function service consumer.

10. The apparatus as claimed in claim 1, wherein:
   the first network function service consumer comprises a network data analytics function (NWDAF).

11. The apparatus as claimed in claim 1, wherein the DCCF is further caused to:
   register profile information for the DCCF at the network repository function, wherein the profile information indicates whether the DCCF is able to allow service requests to proceed for a plurality of consumer network functions.

12. A method for a Data Collection Coordination and Delivery Function (DCCF), the method comprising:

receiving, from a first network function service consumer, a first service request for a service;

comprising, in a first access token request, an indication that both the DCCF and the first network function service consumer are to be indicated as service consumers;

signaling, to a network repository function, the first access token request for a first access token authorizing the service provided by a network function service producer to the first network function service consumer and the DCCF;

receiving, from the network repository function, the first access token indicating the DCCF and the first network function service consumer; and signaling, to the network function service producer, a second service request on behalf of the first network function service consumer for the service provided by the network function service producer, the second service request comprising the first access token indicating the DCCF and the first network function service consumer.

13. The method as claimed in claim 12, wherein:

the DCCF is added as an additional access token claim of the first access token.

14. The method as claimed in claim 12, further comprising:

receiving, from the network function service producer, an indication that the first network function service consumer is authorized for the service.

15. The method as claimed in claim 12, further comprising:

receiving, from a second network function service consumer, a third service request for the service;

comprising, in a second access token request, an indication that both the DCCF and the second network function service consumer are to be indicated as service consumers; and signaling, to the network repository function, the second access token request for a second access token authorizing the service provided by the network function service producer to the second network function service consumer and the DCCF.

16. The method as claimed in claim 15, further comprising:

receiving, from the network repository function, the second access token indicating the DCCF and the second network function service consumer; and signaling, to the network function service producer, a fourth service request on behalf of the second network function service consumer for the service provided by the network function service producer, the fourth service request comprising the second access token indicating the DCCF and the second network function service consumer.

17. The method as claimed in claim 16, wherein:

the DCCF is added as an additional access token claim of the second access token.

18. The method as claimed in claim 12, further comprising:

selecting the network function service producer when the network function service producer is unspecified in the first service request.

19. The method as claimed in claim 12, wherein:

the network function service producer is specified in the first service request.

20. The method as claimed in claim 12, wherein:

the first access token request comprises identifiers for the DCCF and the first network function service consumer.

* * * * *